Figure 1:
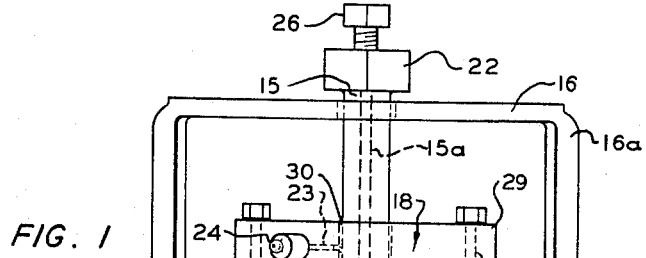

Oct. 11, 1966

T. C. WOOD ETAL 3,278,190

PROTECTION OF PACKING FOLLOWER AND VALVE STEM

Filed June 27, 1963

INVENTORS
T.C. WOOD
R.J. WOOD
A.E. BUTCHER

BY Hudson and Young

ATTORNEYS

3,278,190
PROTECTION OF PACKING FOLLOWER AND VALVE STEM
Thomas C. Wood and Roy J. Wood, Borger, and Albert E. Butcher, Phillips, Tex., assignors to Phillips Petroleum Company, a corporation of Delaware
Filed June 27, 1963, Ser. No. 291,605
3 Claims. (Cl. 277—18)

This application is a continuation-in-part of application S.N. 80,350 filed January 3, 1961, now Patent No. 3,057,695.

This invention relates to packing follower structure of the invention. One aspect of the invention relates to protection of a packing gland follower and the stem of a valve in ambients containing corrosive fluids. Another aspect relates to a method of preventing freezing of a stem or shaft to a surrounding packing follower.

In many chemical manufacturing and petroleum refining operations corrosive fluids are processed at atmospheric and/or at higher temperatures, and at atmospheric and/or at higher than atmospheric pressures. For example, hydrofluoric acid alkylation operations entail transfer of hydrocarbon material and hydrogen fluoride or hydrofluoric acid. Transfer of these materials may be in the vapor phase, liquid phase, or in a mixture of these two phases. Temperatures may be substantially atmospheric or considerably higher than atmospheric. Whatever the operating conditions when processing chemicals like hydrogen, fluoride, corrosion of such equipment as stills, fractionators, heat exchangers, pipes and valves, is apparent. For example, in valves, regardless of their type or materials of construction, valve heads and seating faces may become corroded and pitted and finally fail to function properly when in a closed position. Furthermore, valve stems frequently become frozen against their packing glands even though the valves are properly packed. Even though the stuffing boxes of these valves are packed with suitable packing material, such normally vaporous material, as the above-mentioned hydrofluoric acid, frequently seeps through the packing. It has been observed in such operations that when hydrofluoric acid vapors are in contact with the inner surface of packing glands and the outer surface of the valve stems, with the valves being in open positions for extended periods of time, the valve stems frequently become frozen against rotation.

Also corrosion producing vapors, or even droplets, are frequently found in the atmosphere of plants in which chemicals are handled.

These vapors find their way along a valve stem and cause corrosion of the stem and/or surrounding packing follower.

Another instance in which valve stem freezing occurs is in the aluminum chloride-hydrogen chloride isomerization of hydrocarbons. The presence of hydrogen chloride in the materials passing through a valve, especially in the presence of moisture, may cause not only corrosion within the valve but also corrosion of the valve stem and the packing gland. As mentioned above, when a valve is maintained in an open position with the plant in operation for extended periods of time, the presence of such a corrosion producing material frequently causes freezing of the valve stem against the packing gland.

The use of corrosion-resistant or substantially corrosion-resistant metals in the manufacture of valves for such use is in many instances only a partial solution to the problem.

Accordingly, an object of this invention is to devise an improved packing gland-valve stem structure which eliminates or substantially eliminates the above-mentioned corrosion problem. Another object of this invention is to provide an improved valve stuffing box assembly which eliminates corrosion and valve stem freezing to the packing gland due to the presence of corrosive fluids in a plant process or atmosphere. Still another object of this invention is to provide an improved packing gland the use of which eliminates or substantially eliminates freezing of the valve stem to the packing gland due to corrosion of the adjacent surfaces of these elements of apparatus. Another object of this invention is to provide a relatively inexpensive and easy-to-manufacture improved packing gland for use in valves controlling the flow of corrosive fluids. It is also an object to provide a method of protecting the stem or shaft of a housed rotatable member using a packing gland, such as a plug valve stem, from corrosion and freezing to the surrounding packing follower. Still other objects and advantages of this invention will be apparent from the accompanying disclosure.

Figure 2:
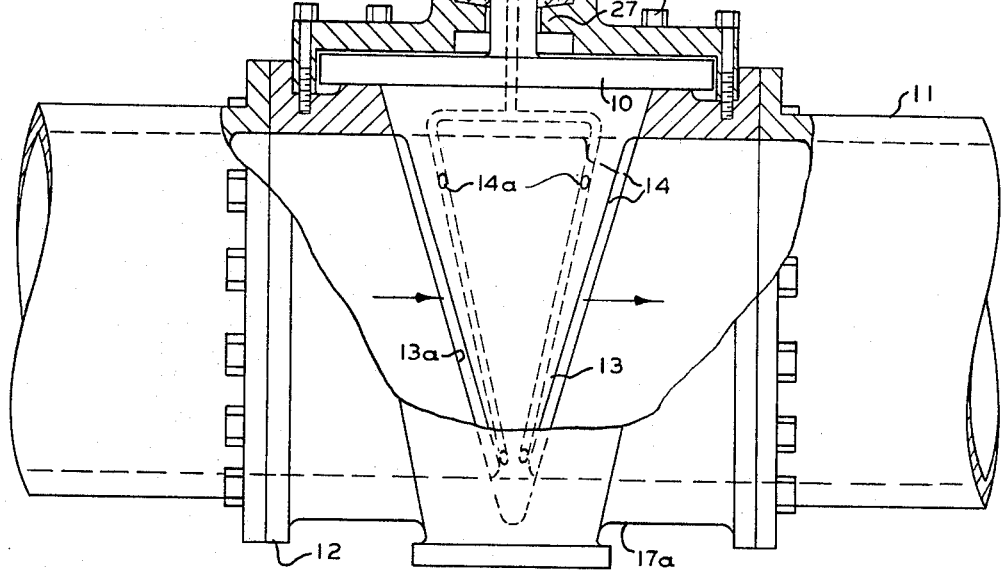
Figure 2:
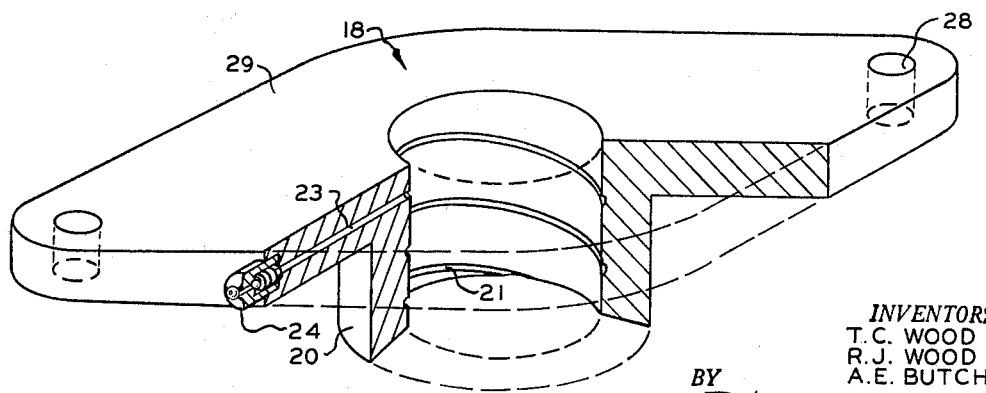

In the drawing, FIGURE 1 is an elevational view, partly in section, of a valve assembly including the improved packing gland of this invention. FIGURE 2 is an elevational view, in perspective and partly in section, illustrating the improved packing gland of this invention.

In the drawing, reference numeral 11 identifies a pipe to which the valve assembly of this invention is attached by couplings 12. These couplings can be of any suitable type which is conventional in the art. The valve proper comprises a valve plug 13 provided with an opening 14 which in one position communicates with or is axially aligned with pipe 11. When such a valve is rotated 90 degrees, the opening 14 is at right angles to the fluid passage in the pipe and the valve is thereby closed. The plug merely rotates in contact with seat 13a. A valve stem 15 is attached rigidly to or is integral with the valve plug head 10 for rotation thereof. The upper end of the valve stem 15 may terminate in a square head which is suitable for use with a tool containing a square socket for opening and closing the valve. Such valve plugs and valve seats are ordinarily of frusto-conical shape and are widely used in processes involving corrosive and other materials.

Valve stem 15 in this type of valve is provided with a duct 15a extending throughout its length for admission of stick lubricant which is forced by a stud bolt 26 through duct 15a and outward through openings 14a in the plug for lubrication of the contacting surfaces of the valve seat and valve plug. Retaining the valve in its operable position is a bonnet 16 which is attached by bolts 17 to the valve body. The bonnet is provided with an inner flange 27 which serves as a bottom seat against which packing 25 is pressed by packing gland 18. Packing gland 18 is maintained in its operable position by stud bolts 19 extending through openings 28. The outer extremity of the bonnet comprises side arms 16a which are spaced apart in such a manner that considerable open space is provided for insertion of a tool to tighten or to loosen bolts 19. The packing gland 18 comprises a hollow cylindrical packing follower 20 attached to the outer end of which is an exterior flange 29. This exterior flange has a pair of bolt holes 28 for insertion of the stud bolts 19.

The foregoing structure is conventional. The invention provides an annulus 30 intermediate stem 15 and the uniform bore of follower 20 with a lubricant duct 23 extending from an accessible surface of the follower, such as the edge of flange 29, to an intermediate section of annulus 30. Helical groove 21 facilitates distribution of lubricant to all of the annulus. This groove begins at the lower end of the bore of follower 20 and intersects duct 23. It may continue to a point near the upper end of the bore. While lubricant can be forced into annulus 30 via duct 23 without helical groove 21, this groove is of substantial benefit when filling annulus 30 with a stiff grease or other heavy lubricant. A lubrication fitting 24 provides a check on backflow of lubricant.

Obviously, any non-corrosive, viscous, flowable material of low volatility which does fill annulus 30 and excludes corrosive fluids is suitable as a filler for the annulus. The problem is not one of lubrication to reduce friction, since so little and so infrequent rotation of stem 15 is required. The problem is to keep out corrosive fluids so that stem 15 does not "freeze" to the bore of follower 20 due to corrosion of the metal therein. Lubricants or grease serve well as filler in the annulus because of their inherent protective characteristics for metals and their stability over long periods.

The packing follower 20 is constructed so that its inner diameter is only a few thousandths of an inch (such as 0.003 to 0.025 or even more) greater than the outer diameter of valve stem 15. This provides sufficient annulus for lubricant or filler. The size of annulus 30 is determined by the viscosity or stiffness of the lubricant or grease to be used, heavier lubricants requiring more clearance.

According to this invention, with the packing gland, packing, valve, and bonnet assembled as described, the assembly is in condition to be lubricated. A lubricant is introduced through fitting 24, duct 23 and thence into groove 21 or directly into annulus 30. The lubricant from the inner end of the duct 23 follows the helical groove 21 all the way to the point at which the groove terminates at the lower end of the follower 20. By forcing lubricant thru duct 23 until lubricant egresses from the upper end of annulus 30, the entire annulus is filled and the entire surface of the valve stem within the packing follower 20, from the point of introduction of lubricant to the bottom of the packing follower, and the entire bore of the packing follower are completely coated and thoroughly lubricated. In this manner, the contacting of these metal surfaces with corrosive fluids is prevented.

While the upper end of annulus 30 is open, the use of the ball check valve 24 makes certain that, when using light lubricant, the lubricant remains in this annulus above the point of introduction of the lubricant through duct 23. If it were not for the use of a lubrication fitting such as a ball check valve, light oil lubricant above duct 23 in the annulus 30 would, upon removal of the lubricant injector, tend to back flow through opening 23 until the level of the lubricant in the annulus reached the level of the opening 23. In this manner the small section of the annulus above the level of duct 23 would tend to be unprotected.

When using a ball check valve for maintaining lubricant in this valve in its proper position, apparatus for injecting lubricant into the lubricator is conventionally a gun-type apparatus and such equipment is commonly available.

Any suitable type of lubricant can be used in this valve provided it is resistant to the action of the fluids in process and is sufficiently viscous or plastic. As hereinbefore explained, a flowable or plastic lubricant of relatively low viscosity is used in some cases according to this invention. However, it is preferable to use an acid-resistant grease in the apparatus of this invention. Such a grease is manufactured by Climax Engineering Maintenance Co., 7902 E. Elm Street, Houston 12, Texas. This grease is known as a 400 and 400S grease, the former being in stick form and the latter in bulk form. The grease is forced through the ball check valve 24, the duct 23 to fill annulus 30 and groove 21.

Even though packing gland leakage should be appreciable, in the event of failure to adjust bolts 28 as required, upon passage of the fluid through the packing or between the packing and the valve stem and movement upward in the annulus between the valve stem and the packing follower, the bore of the packing follower and the outer surface of the valve stem are wet with lubricant and even under this condition corrosion of these surfaces is greatly minimized in comparison to the corrosion of these surfaces without the use of the lubricant. Heavy grease in annulus 30 provides more protection from such leakage than light oils.

The apparatus of this invention has its main utility in valves in which the valve stem rotates for opening and closing the valves. The invention is applicable to plug valves, gate valves, globe valves, and similar valves.

The device of the invention, substantially as illustrated in the drawing and described herein, has been installed on more than 400 valves in commercial plants. The valves were purchased from reliable valve manufacturers and were reputedly among the best on the market for the service involved. These valves had given frequent trouble wherein the stem froze to the packing gland follower. When this occurred, it was usually necessary to return the malfunctioning valve to the manufacturer for rebuilding. The cost was substantial and the valve was lost from service for several months. This required a substantial inventory of valves for replacements.

The valves were modified by drilling the follower in each instance to provide a lubricant duct thru the follower connecting with a spiral distribution channel in the bore. A lube fitting was installed at the duct entrance and the annulus formed by the bore and stem was filled with grease.

The installation of the invention on these valves has eliminated the problem of valve stem freezing and greatly decreased plant maintenance as well as increasing plant efficiency (causing less "down time").

Remodeling of valves is continuing and eventually 600 valves will be so modified. The modified gland follower is used on various rotary pumps, Stewart Warner air motors, vaves on lines and even on plumbing fixtures. Hence, the invention is applicable to any packing gland follower utilized on a rotatable stem or shaft operating thru a seal formed by a packing gland.

While certain embodiments of the invention have been described for illustrative purposes, the invention obviously is not limited thereto.

We claim:

1. Apparatus comprising in combination:
   (1) a valve stem and a plug valve head rigidly attached to one end of said stem;
   (2) a packing gland surrounding a first section of said valve stem adjacent said valve head provided with an annulus for packing and packing material in said annulus;
   (3) a packing follower surrounding a second section of said stem adjacent said first section and remote from said valve head, provided with a bore of uniform diameter forming a narrow annulus for lubricant extending the full length of said follower to space said follower from said stem at all points, the end of said follower adjacent said packing gland cooperating therewith to form a seal around said stem;
   (4) adjustable means on said follower remote from said packing gland for attaching said follower to and forcing same toward said packing gland, said stem being operable solely by rotation within elements (2) and (3); and
   (5) a lubricant duct extending from said bore thru said follower to an accessible surface thereof for injection of lubricant to said annulus.

2. The apparatus of claim 1 including a groove in said bore extending substantially from end to end thereof and communicating with the inner end of said duct and a ball check valve lubricant fitting in the outer end of said duct.

3. Apparatus comprising in combination:
   (1) a valve stem having a valve head rigidly attached to one end and turning means on the opposite end;

(2) a packing gland surrounding a section of said stem adjacent said valve head forming an annulus with said stem, said annulus being filled with packing material;
(3) a packing follower surrounding a section of said stem adjacent the section of (2) and forming an annulus of substantial thickness with said stem coextensive with said follower to prevent contact of said stem with said follower when said annulus is filled with non-corrosive material;
(4) means for filling said annulus with said non-corrosive material; and
(5) means for urging the follower of (3) against the packing material of (2).

References Cited by the Examiner
UNITED STATES PATENTS

| | | | |
|---|---|---|---|
| 1,051,879 | 2/1913 | Garry | 277—21 |
| 1,239,132 | 9/1917 | Smith | 277—18 |
| 1,599,172 | 9/1926 | Goodbrake | 251—355 X |
| 2,643,679 | 6/1953 | Keammerer | 251—355 |
| 2,660,397 | 11/1953 | Volpin | 137—246.12 |
| 3,050,077 | 8/1962 | Wheateley | 251—355 X |

FOREIGN PATENTS 803,206    3/1951    Germany.

SAMUEL ROTHBERG, *Primary Examiner.*

LAVERNE D. GEIGER, *Examiner.*